(12) United States Patent
Douglas

(10) Patent No.: US 12,384,229 B1
(45) Date of Patent: Aug. 12, 2025

(54) VEHICLE SIDE PANEL PROTECTORS

(71) Applicant: Terrance Douglas, Franklin Park, NJ (US)

(72) Inventor: Terrance Douglas, Franklin Park, NJ (US)

( * ) Notice: Subject to any disclaimer, the term of this patent is extended or adjusted under 35 U.S.C. 154(b) by 413 days.

(21) Appl. No.: 17/991,872

(22) Filed: Nov. 22, 2022

(51) Int. Cl.
  *B60J 11/06* (2006.01)

(52) U.S. Cl.
  CPC ................................. *B60J 11/06* (2013.01)

(58) Field of Classification Search
  CPC . B60J 11/06; B60J 11/00; B60R 13/04; B60R 13/043; B60R 13/00; B60R 13/0243; B60R 19/42; B60R 19/03; B60R 19/38; B60R 19/14; B60R 19/00; B60R 19/46; B60R 19/24; B60R 19/02; B60R 19/04
  See application file for complete search history.

(56) References Cited

U.S. PATENT DOCUMENTS

| | | | |
|---|---|---|---|
| 4,750,767 A | 6/1988 | Barnett | |
| 5,050,925 A * | 9/1991 | Brown | B60J 11/06 296/136.03 |
| 5,275,460 A * | 1/1994 | Kraus | B60J 11/06 160/DIG. 16 |
| 5,799,992 A | 9/1998 | Kojima | |
| 6,062,617 A | 5/2000 | Marks | |
| 6,415,832 B1 * | 7/2002 | Ricks | B60J 11/00 150/166 |
| 6,457,755 B1 | 10/2002 | Nieto | |
| 8,702,136 B2 * | 4/2014 | Azhagesan | B60J 11/06 293/126 |
| 8,746,762 B2 | 6/2014 | Darrett | |
| 8,888,163 B1 * | 11/2014 | Johnson | B60J 1/20 296/84.1 |
| D741,757 S | 10/2015 | Roberts | |
| 9,393,856 B2 * | 7/2016 | Ogilvie | B60J 1/2011 |
| 9,676,262 B2 * | 6/2017 | Peries | B60J 11/08 |
| 9,862,258 B2 | 1/2018 | Schmidt | |
| 10,173,611 B2 * | 1/2019 | Tayo | B60J 11/06 |
| 11,007,852 B2 * | 5/2021 | Wilson, III | B60R 21/13 |
| 11,428,506 B2 * | 8/2022 | Azhagesan | F41H 5/226 |
| 11,639,090 B2 * | 5/2023 | Spater | B60J 1/2094 296/152 |
| 12,257,884 B2 * | 3/2025 | Yu | B29C 45/0062 |
| 2006/0097528 A1 * | 5/2006 | Southerland | B60J 11/06 293/128 |
| 2007/0176462 A1 * | 8/2007 | Lombardo | B60J 11/00 296/136.1 |
| 2008/0258482 A1 * | 10/2008 | Udolph | B60R 19/42 293/128 |

(Continued)

FOREIGN PATENT DOCUMENTS

GB      2344329      7/2002

*Primary Examiner* — James M Dolak
(74) *Attorney, Agent, or Firm* — Kyle A. Fletcher, Esq.

(57) ABSTRACT

The vehicle side panel protector is a protective structure. The vehicle side panel protector incorporates a mesh structure, a primary panel, an extension panel, an anchor structure, and a vehicle. The mesh structure attaches to the primary panel. The extension panel attaches to the primary panel. The anchor structure attaches to the mesh structure. The anchor structure secures the mesh structure to the vehicle. The mesh structure, the primary panel, and the extension panel form protecting surfaces that protect the exterior surface of the vehicle.

10 Claims, 2 Drawing Sheets

(56) References Cited

U.S. PATENT DOCUMENTS

2009/0151827 A1\* 6/2009 Thompson ............... E06B 7/28
　　　　　　　　　　　　　　　　　　　　　　160/368.1
2015/0258880 A1\* 9/2015 Wheeler ................. B60J 11/06
　　　　　　　　　　　　　　　　　　　　　　293/127

\* cited by examiner

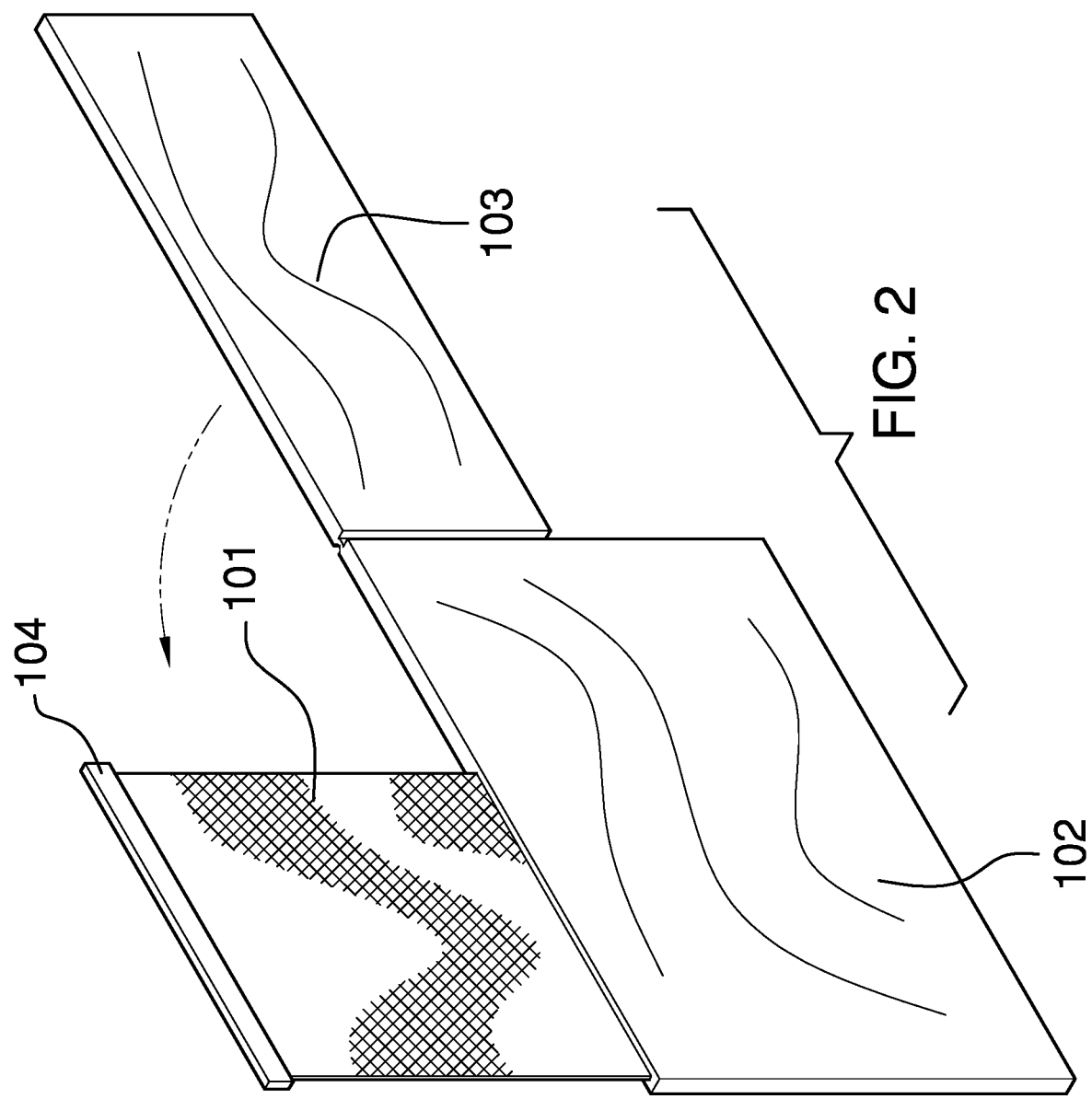

VEHICLE SIDE PANEL PROTECTORS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of removable external protective coverings specially adapted for vehicles. (B60J11/06)

SUMMARY OF INVENTION

The vehicle side panel protector is a protective structure. The vehicle side panel protector comprises a mesh structure, a primary panel, an extension panel, an anchor structure, and a vehicle. The mesh structure attaches to the primary panel. The extension panel attaches to the primary panel. The anchor structure attaches to the mesh structure. The anchor structure secures the mesh structure to the vehicle. The mesh structure, the primary panel, and the extension panel form protecting surfaces that protect the exterior surface of the vehicle.

These together with additional objects, features and advantages of the vehicle side panel protector will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle side panel protector in detail, it is to be understood that the vehicle side panel protector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle side panel protector.

It is therefore important that the claims be regarded as including such equivalent construction insofar as they do not depart from the spirit and scope of the vehicle side panel protector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a perspective view of an embodiment of the disclosure.

DETAILED DESCRIPTION OF THE EMBODIMENT

Figure 1:
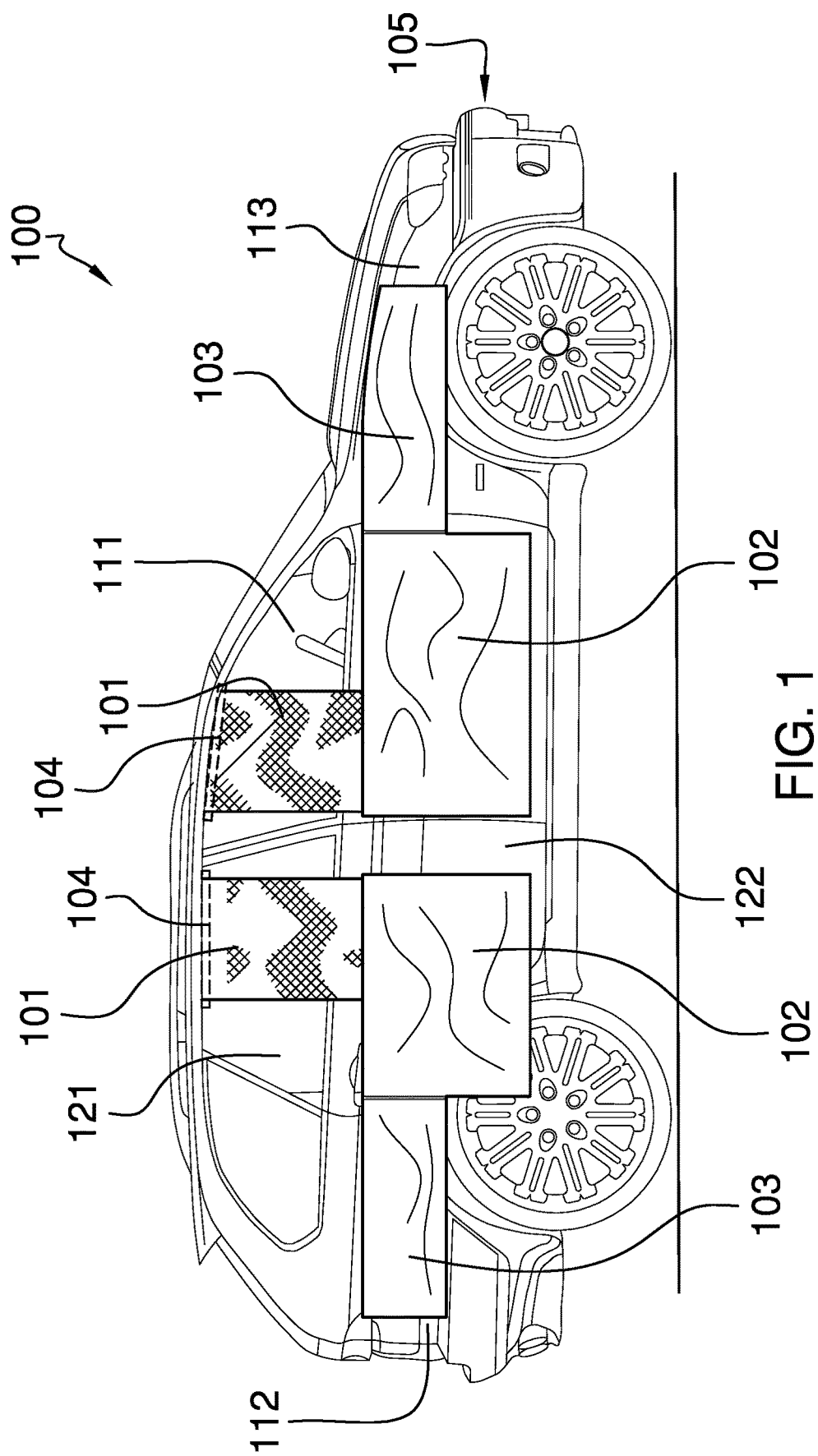
FIG. 1 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 2.

The vehicle side panel protector 100 (hereinafter invention) is a protective structure. The invention 100 incorporates a mesh structure 101, a primary panel 102, an extension panel 103, an anchor structure 104, and a vehicle 105. The mesh structure 101 attaches to the primary panel 102. The extension panel 103 attaches to the primary panel 102. The anchor structure 104 attaches to the mesh structure 101. The anchor structure 104 secures the mesh structure 101 to the vehicle 105. The mesh structure 101, the primary panel 102, and the extension panel 103 form protecting surfaces that protect the exterior surface of the vehicle 105.

The vehicle 105 is a motorized device used to transport cargo and passengers over a road network. The vehicle 105 is defined elsewhere in this disclosure. The vehicle 105 comprises a door 111, a quarter panel 112, and a forward panel 113.

The quarter panel 112 is a panel of the vehicle 105. The quarter panel 112 is a rear side panel of the vehicle 105. The quarter panel 112 is defined elsewhere in this disclosure.

The forward panel 113 is a panel of the vehicle 105. The forward panel 113 is a forward side panel of the vehicle 105. The forward panel 113 is defined elsewhere in this disclosure. The mesh structure 101 forms a protecting surface that protects the door 111 window 121 of the vehicle 105.

The door 111 is a rotating structure. The door 111 forms a barrier structure. The door 111 controls the access from the environment to the cab of the mesh structure 101. The door 111 rotates between an open position and a closed position. The door 111 permits access into the cab in the open position. The door 111 encloses the cab in the closed position. The door 111 further comprises a door 111 window 121 and a door 111 panel 122.

The door 111 window 121 forms a barrier structure between the interior of the cab of the vehicle 105 and the environment surrounding the vehicle 105. The door 111 window 121 is a transparent structure. The door 111 window 121 provides visibility between the interior of the cab of the vehicle 105 and the environment surrounding the vehicle 105. The door 111 window 121 transitions between an open position and a closed position. The open position of the door 111 window 121 allows air to flow between the environment and the cab. The closed position of the door 111 window 121 prevents air from flowing between the environment and the cab.

The door 111 panel 122 is a panel of the door 111 of the vehicle 105. The door 111 panel 122 forms the exterior surface of the door 111 of the vehicle 105.

The mesh structure 101 is a rigid structure. The mesh structure 101 is formed as a mesh. The mesh structure 101 is formed from a metal. The mesh structure 101 is a disk shaped structure. The mesh structure 101 is roughly geometrically similar to the door 111 window 121. The mesh structure 101 is sized such that the perimeter of the disk structure of the mesh structure 101 fits within the transparent structure of the door window 121. The mesh structure 101 is suspended from the door 111 of the vehicle 105. The mesh structure 101 encloses the exterior surface of the door 111 window 121 of the vehicle 105. The metal structure of the mesh structure 101 protects the door 111 window 121 from impact damage from objects on the exterior side of the vehicle 105.

The anchor structure 104 is a rigid structure. The anchor structure 104 is a prism shaped structure. The anchor structure 104 attaches to the superior lateral edge of the mesh structure 101. The anchor structure 104 secures the mesh structure 101 to the anchor structure 104. The anchor structure 104 inserts into the cab of the vehicle 105 while the door 111 of the vehicle 105 is open. The door 111 window 121 is closed such that: a) the anchor structure 104 remains in the cab of the vehicle 105; while simultaneously, b) a portion of the mesh structure 101 is sandwiched between the door 111 of the vehicle 105 and the cab of the vehicle 105. The anchor structure 104 forms a stop the prevents the mesh structure 101 from being pulled out of the vehicle 105 when the invention 100 is in use.

The primary panel 102 forms a protecting surface that protects the door 111 panel 122 of the vehicle 105. The primary panel 102 is a rigid structure. The primary panel 102 is a non-Euclidean disk structure. The primary panel 102 is geometrically identical to the door 111 panel 122 of the vehicle 105. The primary panel 102 follows the contour of the door 111 panel 122 such that the primary panel 102 lies flush against the exterior surface of the door 111 panel 122. The superior lateral edge of the non-Euclidean disk structure of the primary panel 102 attaches to the inferior lateral edge of the disk structure of the mesh structure 101. The mesh structure 101 suspends the primary panel 102 over the exterior surface of the door 111 panel 122.

The extension panel 103 forms a protecting surface that protects a targeted panel of the vehicle 105 selected from the group consisting of the quarter panel 112 and the forward panel 113. The extension panel 103 is a rigid structure. The extension panel 103 is a non-Euclidean disk structure. The extension panel 103 is geometrically identical to the targeted panel of the vehicle 105. The extension panel 103 follows the contour of the targeted panel such that the extension panel 103 lies flush against the exterior surface of the targeted panel. A vertically oriented lateral edge of the non-Euclidean disk structure of the extension panel 103 attaches to a vertically oriented lateral edge of the non-Euclidean disk structure of the primary panel 102. The primary panel 102 suspends the extension panel 103 over the exterior surface of the targeted panel.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clutch: As used in this disclosure, a clutch is a mechanical device that attaches and detaches a first rotating device to and from a second device that provides the energy required to rotate the first rotating device.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a rotating barrier that is attached to the frame that forms the cab of a vehicle. The door controls access into and out of the cab. The door controls access through an aperture formed in the frame.

Door Panel: A used in this disclosure, a door panel is the panel of the body of an automobile that forms a portion of a door that provides access into the cab of the vehicle.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Flush: As used in this disclosure, the term flush is used to describe the alignment of a first surface and a second surface to form a single structure selected from the group consisting of a Euclidean plane and a non-Euclidean plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward Panel: As used in this disclosure, the forward panel is the panel of the body of an automobile that is located between a forward door of an automobile and the front of the vehicle. Automobiles typically have a left forward panel and a forward quarter panel. The left forward panel is located on the driver's side of left hand drive automobile. The right forward is located on the panel passenger side of a left hand drive automobile.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Metal: As used in this disclosure, a metal is an element that readily loses electrons or an alloy formed from a plurality of such elements. General properties of metals include, but are not limited to, the ability to conduct heat, conduct electricity, malleability, and the ability to be drawn into a wire. For the purposes of this disclosure, the term metal is assumed to include the transition metals (columns 3-12 of the periodic table) and aluminum, tin, and lead. The alkali metals (columns 1 of the periodic table) and the alkali earth metals (column 2 of the periodic table) are assumed to be excluded from this definition. In this disclosure, the preferred metals for conducting electricity are selected from the group consisting of copper, aluminum, silver, and gold.

In this disclosure, the preferred metals for structural purposes are selected from the group consisting of aluminum, iron, and iron based mixtures of metals commonly referred to as steel.

Monomer: As used in this disclosure, a monomer refers to a molecular structure that bonds to itself in a repeating manner to form a polymer.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

Pan: As used in this disclosure, a pan is a hollow prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Panel: As used in this disclosure, a panel is a shaped metal structure that forms a portion of the body of an automobile.

Perimeter: As used in this disclosure, a perimeter is one or more curved or straight lines that bounds an enclosed area on a plane or surface. The perimeter of a circle is commonly referred to as a circumference.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protecting Surface: As used in this disclosure, a protecting surface is a disk shaped structure. The protecting surface forms a boundary structure that separates a protected surface from the environment. The protecting surface is a sacrificial structure that protects the protected surface from damage.

Quarter Panel: As used in this disclosure, the quarter panel is the panel of the body of an automobile that is located between a rear door of an automobile and the trunk panel. Automobiles typically have a left quarter panel and a right quarter panel. The left quarter panel is located on the driver's side of left hand drive automobile. The right quarter is located on the panel passenger side of a left hand drive automobile.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Sacrificial Structure: As used in this disclosure, a sacrificial structure is a first object or structure that protects a second object or structure from damage. More specifically, the sacrificial structure protects the second object or structure by being damaged instead of the second object or structure.

Sandwich: As used in this disclosure, to sandwich means to insert a disk-shaped structure between the exterior surface of a first structure and the exterior surface of a second structure to form a composite structure. Specifically: a) a first congruent end of the disk-shaped structure is placed against the exterior surface of the first structure; and, b) a second congruent end of the disk-shaped structure is placed against the exterior surface of the second structure. The verb to sandwich describes the act of placing the disk-shaped structure between the first structure and the second structure.

Scroll: As used in this disclosure, a scroll is a sheeting that is stored as a roll.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Stop: As used in this disclosure, a stop is a mechanical structure that blocks the motion of an object along a track. The stop is used to limit the range of motion of the object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object. Include inferior superior and load path.

Vehicle: As used in this disclosure, a vehicle is a motorized device that is used for transporting passengers, goods, or equipment. The term motorized vehicle refers to a vehicle can move under power provided by an electric motor or an internal combustion engine. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Window: As used in this disclosure, a window is an opening in the body of a vehicle that is fitted with glass or other transparent material in a frame to admit light or air and that allows people to see out. Windshields and windscreens are explicitly considered to be windows in this definition.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle side panel protector comprising:
a mesh structure, a primary panel, an extension panel, an anchor structure, and a vehicle;
wherein the mesh structure attaches to the primary panel;
wherein the extension panel attaches to the primary panel;
wherein the anchor structure attaches to the mesh structure;
wherein the anchor structure secures the mesh structure to the vehicle;
wherein the vehicle side panel protector is a protective structure;
wherein the mesh structure, the primary panel, and the extension panel form protecting surfaces that protect an exterior surface of the vehicle from damage attributed from debris hitting the exterior surface, and damaging the exterior surface of the vehicle;
wherein the mesh structure is geometrically similar to a window of a door of the vehicle;
wherein the mesh structure is sized such that a perimeter of the mesh structure fits within a transparent structure of the window of the door of the vehicle;
wherein the mesh structure is suspended from the door of the vehicle; wherein the mesh structure encloses the exterior surface of the window of the door of the vehicle;
wherein the mesh structure is a metal structure that protects the window of the door from impact damage from objects on an exterior side of the vehicle.

2. The vehicle side panel protector according to claim 1
wherein the vehicle is a motorized device used to transport cargo and passengers over a road network;
wherein the vehicle comprises the door, a quarter panel, and a forward panel;
wherein the quarter panel is a panel of the vehicle;
wherein the quarter panel is a rear side panel of the vehicle;
wherein the forward panel is a panel of the vehicle;
wherein the forward panel is a forward side panel of the vehicle;
wherein the mesh structure forms a protecting surface that protects the window of the door of the vehicle;
wherein the door is a rotating structure;
wherein the door forms a barrier structure;
wherein the door controls the access from the environment to a cab of the vehicle.

3. The vehicle side panel protector according to claim 2
wherein the door further comprises the window of the door and a door panel;
wherein the door window forms a barrier structure between the interior of the cab of the vehicle and the environment surrounding the vehicle;
wherein the door window is a transparent structure;
wherein the door window provides visibility between the interior of the cab of the vehicle and the environment surrounding the vehicle;

wherein the door panel is a panel of the door of the vehicle;

wherein the door panel forms the exterior surface of the door of the vehicle.

4. The vehicle side panel protector according to claim 3 wherein the mesh structure is a rigid structure;

wherein the mesh structure is formed as a mesh;

wherein the mesh structure is formed from a metal.

5. The vehicle side panel protector according to claim 4 wherein the anchor structure is a rigid structure;

wherein the anchor structure attaches to a superior lateral edge of the mesh structure;

wherein the anchor structure secures the mesh structure to the anchor structure.

6. The vehicle side panel protector according to claim 5 wherein the anchor structure inserts into the cab of the vehicle while the door of the vehicle is open;

wherein the window of the door is closed such that: a) the anchor structure remains in the cab of the vehicle; while simultaneously, b) a portion of the mesh structure is sandwiched between the door of the vehicle and the cab of the vehicle;

wherein the anchor structure prevents the mesh structure from being pulled out of the vehicle.

7. The vehicle side panel protector according to claim 6 wherein the primary panel forms a protecting surface that protects the door panel of the vehicle;

wherein the primary panel is a rigid structure.

8. The vehicle side panel protector according to claim 7 wherein the extension panel forms a protecting surface that protects a targeted panel of the vehicle selected from the group consisting of the quarter panel and the forward panel;

wherein the extension panel is a rigid structure.

9. The vehicle side panel protector according to claim 8 wherein the primary panel is geometrically identical to the door panel of the vehicle;

wherein the primary panel follows the contour of the door panel such that the primary panel lies flush against an the exterior surface of the door panel;

wherein the primary panel attaches to the mesh structure;

wherein the mesh structure suspends the primary panel over the door panel.

10. The vehicle side panel protector according to claim 9, wherein the extension panel is geometrically identical to the targeted panel of the vehicle;

wherein the extension panel follows the contour of the targeted panel such that the extension panel lies flush against the exterior surface of the targeted panel;

wherein a vertically oriented lateral edge of the extension panel attaches to the primary panel;

wherein the primary panel suspends the extension panel over the exterior surface of the targeted panel.

\* \* \* \* \*